Sept. 22, 1959   H. P. JANES   2,905,197
THREE-WAY BALL VALVE
Filed March 26, 1956   2 Sheets-Sheet 2
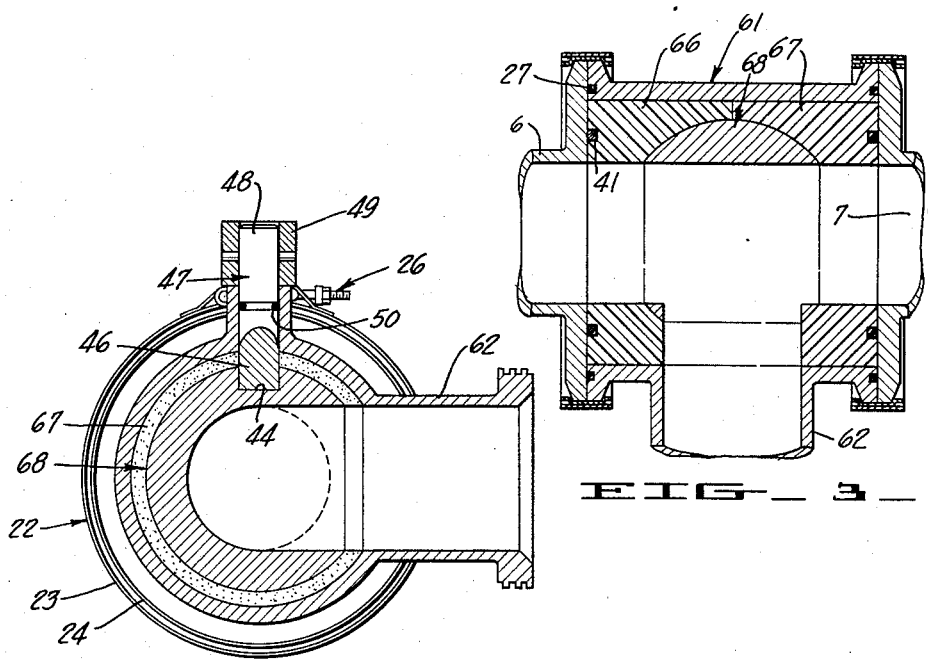
INVENTOR.
Harry P. Janes
BY ECKHOFF & SLICK, Attys.
A member of the firm.

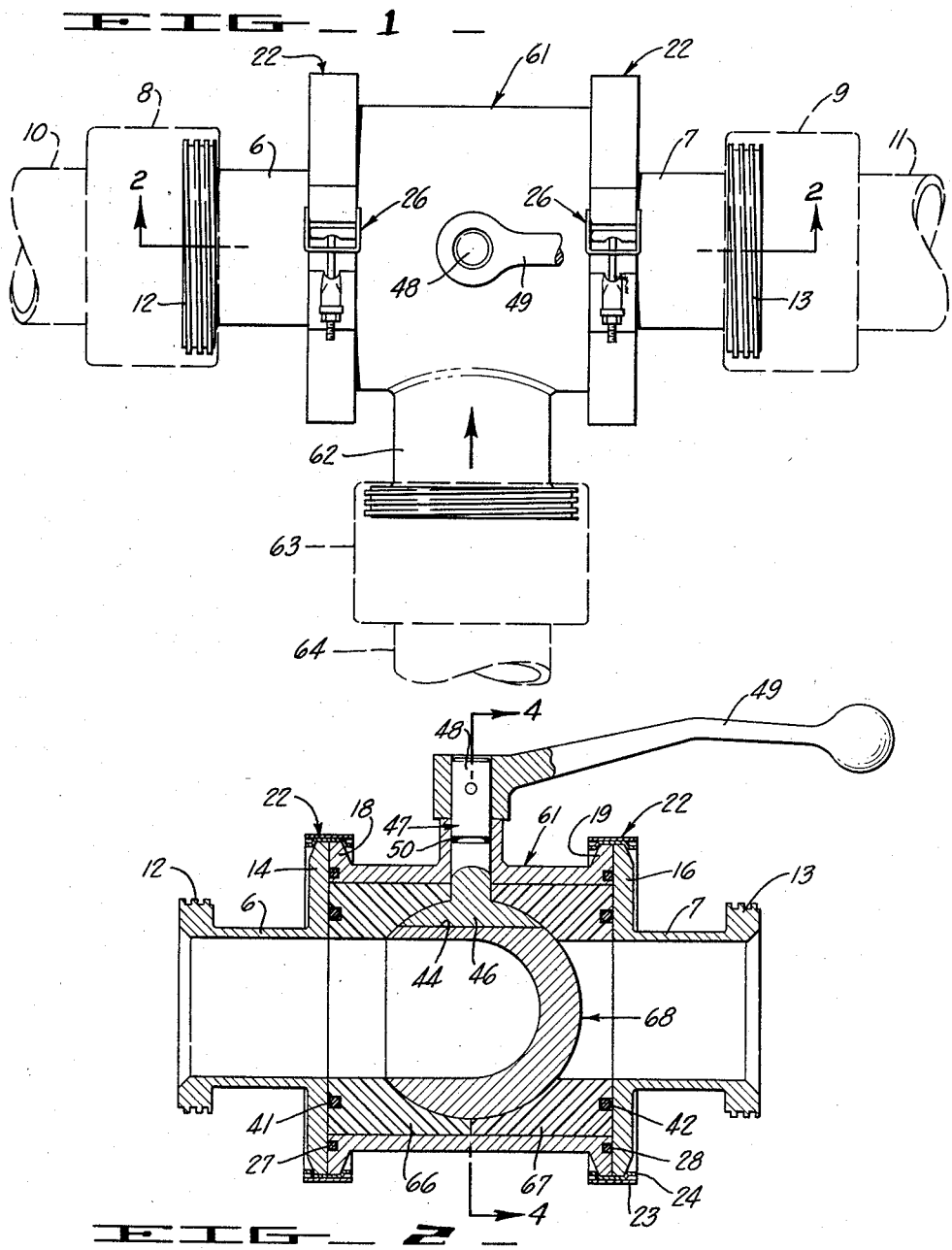

United States Patent Office 2,905,197
Patented Sept. 22, 1959

2,905,197

THREE-WAY BALL VALVE

Harry P. Janes, Walnut Creek, Calif.

Application March 26, 1956, Serial No. 574,029

1 Claim. (Cl. 137—625.47)

This invention relates to valves and particularly to an improved sanitary valve.

In the preparation of various foodstuffs, pharmaceuticals and the like, it is usual to provide equipment of such fashion that it can be readily disassembled, inspected and cleaned. This is particularly true of valves which may provide pockets and the like wherein material may collect.

It is in general the broad object of the present invention to provide an improved valve which can be readily taken apart, cleaned, inspected and then reassembled.

An additional object of the present invention is to provide a valve constructed of such materials that it can be employed for the handling of foodstuffs, pharmaceuticals and the like. In this connection, it is to be pointed out that to reduce corrosion and avoid metallic contamination, the metal components of such systems are frequently made of stainless steel. Heretofore, it has been usual to provide sanitary valves of stainless steel, a stainless steel plug turning in a stainless steel body. Because of the use of the same metal, a tendency exists for the plug to grab and seize in the body, particularly if the fluid being handled through the valve is one containing such a material as sugar. In accordance with this invention, I am able to provide a valve which includes certain parts of stainless steel and other parts of a suitable non-metallic material, e.g., a fiber forming synthetic linear polyamide or, preferably, a tetrafluoroethylene polymer. With a seat and a plug fashioned of different materials, e.g., a metal and a non-metal, a relatively low coefficient of friction is present between the two and the valve plug turns readily in the valve seat and does not seize.

A further advantage of the non-metallic material is that it fills the void body area, eliminating possible pockets of contamination by lodged food particles.

The invention includes other objects and features of advantage, some of which, together with the foregoing, will appear hereinafter wherein the present preferred embodiment of a sanitary valve embodying the present invention is disclosed. In the drawing accompanying and forming a part hereof, Figure 1 is a plan view of the three-way diverting valve of this invention.

Figure 2 is a sectional view taken along the line 2—2 of Figure 1.

Figure 3 is a view somewhat similar to Figure 1, but in section, showing the relationship of certain of the interior parts of the valve when all three passages are open.

Figure 4 is a sectional end elevation showing the relation of various of the interior parts of the valve when all three passages are open.

Referring to the drawings, valve inlet and outlet members 6 and 7 are shown as mounted between couplings 8 and 9 on pipes 10 and 11, the inlet and outlet members 6 and 7 including suitable threaded members 12 and 13. The coupling means form no part of the present invention and it is obvious that any other coupling means can be used, such as are well-known to those skilled in the art. At their other ends, the inlet and outlet members 6 and 7 have flanges 14 and 16 positioned opposite one another with the opposed faces of the flanges extending in a spaced relation and parallel to one another. Mounted between flanges 14 and 16 is a housing 61 having flanges 18 and 19 at each end thereof and a valve stem neck extending radially.

Means are provided for securing the casing between the flanges 14 and 16. Preferably, the securing means are such that they may be quickly positioned and secured so that housing 61 can be removed from its position between the flanges 14 and 16. The securing means shown in the drawing are generally indicated at 22. Each securing means includes a generally circular band 23 having a flanged ring 24 mounted about its inner periphery and being particularly adapted to fit the flanges 14 and 18 and 16 and 19 and to secure these together in a fluid-tight connection. The ends of the ring 23 are joined by quickly detachable clamp means generally indicated at 26. Resilient annular rings 27 and 28 are mounted in suitable receptacles in the flanges 18 and 19 to provide a sealing between the respective flange pairs, 14 and 18 and 16 and 19.

The interior of the casing 61 is a uniform cylindrical bore. Mounted slidably within the cylindrical bore of casing 61 are two generally cylindrical valve seating members 66 and 67. These members have an interior passage, continuing the passage through the inlet and outlet members 6 and 7. In addition, members 66 and 67 are so formed on one side of each that an inlet passage is provided adjacent inlet portion 62 of the valve housing, which inlet portion is connected by suitable coupling 63 to an inlet pipe 64. The members 66 and 67 are suitably recessed to cooperate with a generally spherical ball valve plug 68. Each of the recessed members 66 and 67 is urged into tight sealing engagement with the ball plug member by the resilient sealing rings 41 and 42 engaged respectively with flanges 14 and 16. The ball plug describes a C when viewed from one side, as shown particularly in Figure 2. See also Figure 4, wherein the plug is shown in such a position that all three passage-ways are in communication with each other simultaneously. As seen in Figure 2, however, the plug may be turned in such a fashion that only a single passage-way is blocked, thereby leaving two of the passages in communication with each other.

The depths of the grooves in which resilient rings 41 and 42 are seated are sufficiently small in relation to the cross-section of the sealing rings that the rings urge the valve seating members 66 and 67 into a tight fit with the ball plug valve member 68 when the entire valve unit is assembled.

In accordance with this invention, the valve ball member 68 is provided with a slot 44 fitting the cross bar 46 on a T-shaped valve operating member 47. The stem 48 of the valve operating member extends through the neck on the casing and carries a removable handle 49; a sealing ring 50 is provided about the stem 48 to seal this in the neck. The valve seating members provide a cylindrical passage for the valve stem 48 while the underside of the cross bar 46 has a spherical contour to fit in the ball and rotate with it in its seat.

By releasing each of the quickly detachable clamp means 26, the assembled valve is quickly removed from position between the flanges 14 and 16. When removed, the entire valve may be readily taken apart by removing the valve seat members 66 and 67. The valve ball 68 is removed with the cross bar 46 on the valve operating member 47 aligned with the run of the casing 61 so that the ball slides out readily. By removing handle 48 from its connection with the stem 47, the operating portion can be removed by sliding the valve stem 48 through the neck. In this manner, the entire valve can be taken apart, cleaned, inspected and reassembled by reversing the procedure outlined.

In those instances wherein it is desired to operate with a minimum of corrosive attack, it is possible to make portions of the valve of one material and the ball 68 of another material. Thus, for example, the valve including seating members 66 and 67 can be fashioned of the aforementioned polymers or others such as Teflon, nylon or other material compatible with the metallic elements present, while the valve ball 68 can be made of stainless steel.

From the foregoing, I believe it will be apparent that I have provided a relatively novel, simple and improved sanitary valve.

I claim:

A valve comprising: a housing having an inlet at one side thereof and two outlets positioned at right angles thereto and opposed to one another, whereby to form a T-shaped structure; a rotatably mounted metallic valve member within said housing, said valve member being generally spherical and highly polished on the exterior surface thereof, said spherical valve member having a generally hollowed-out center whereby to present the appearance of a C when viewed from one side, the central portion of the spherical surface of said valve member being only of sufficient size to completely obstruct one of said three passages when positioned therebefore, while leaving each of said other passages open; a spherically interiored receptacle of Teflon filling substantially the entirety of the volume between said spherical member and the inner surfaces of said housing to support said spherical valve, said receptacle having T-shaped passages therethrough opposed to each of said outlets and said inlet of said housing, said Teflon receptacle being divided into separate two halves, one half facing one of said opposed outlets and the other half facing the other of said opposed outlets, said halves of said receptacle being maintained in a sealing relationship by means of a resilient ring abutting the outermost face of each of said halves, said rings being compressed between each of said halves and a circular flange, each of said flanges abutting and being normally secured in a unitary relationship with said housing; and means for rotating said spherical valve member whereby to provide any combination of passages through said valve desired.

References Cited in the file of this patent

UNITED STATES PATENTS

| | | |
|---|---|---|
| 909,545 | Cash | Jan. 12, 1909 |
| 1,352,423 | Arbon | Sept. 14, 1920 |
| 1,417,808 | Dewey | May 30, 1922 |
| 1,616,386 | Stroske | Feb. 1, 1927 |
| 2,063,699 | Schellin | Dec. 8, 1936 |
| 2,548,249 | Woolsey | Apr. 10, 1951 |
| 2,751,185 | Shand | June 19, 1956 |
| 2,776,104 | Sinkler | Jan. 1, 1957 |
| 2,797,701 | Nurkiewicz | July 2, 1957 |

FOREIGN PATENTS

| | | |
|---|---|---|
| 692,085 | Great Britain | May 27, 1953 |